United States Patent
Chang et al.

(10) Patent No.: US 8,044,339 B2
(45) Date of Patent: Oct. 25, 2011

(54) INTENSITY-BASED OPTICAL ENCODER USING DIGITAL DIFFRACTIVE OPTIC REGIONS

(75) Inventors: Christopher C. Chang, Brentwood, CA (US); Bernard C. Kress, Neubourg (FR)

(73) Assignee: Arcus Technology, Inc., Livermore, CA (US)

( * ) Notice: Subject to any disclaimer, the term of this patent is extended or adjusted under 35 U.S.C. 154(b) by 0 days.

(21) Appl. No.: 12/348,272

(22) Filed: Jan. 2, 2009

(65) Prior Publication Data
US 2009/0166519 A1    Jul. 2, 2009

Related U.S. Application Data

(60) Provisional application No. 61/018,613, filed on Jan. 2, 2008.

(51) Int. Cl.
  *G01D 5/34* (2006.01)
  *H03M 1/22* (2006.01)
(52) U.S. Cl. ......... 250/231.14; 250/231.17; 250/231.18; 341/13

(58) Field of Classification Search .......... 250/231.13–231.18, 237 G, 237 R; 356/614–622; 341/11, 341/13, 31; 33/1 PT, 1 N
See application file for complete search history.

(56) References Cited

U.S. PATENT DOCUMENTS

| | | | |
|---|---|---|---|
| 4,956,553 A * | 9/1990 | Matsui | 250/237 G |
| 7,595,480 B2 * | 9/2009 | Kress | 250/231.13 |

* cited by examiner

*Primary Examiner* — Georgia Y Epps
*Assistant Examiner* — Don Williams
(74) *Attorney, Agent, or Firm* — Wilson Ham & Holman; Thomas H. Ham (57) ABSTRACT

An optical encoder and method for measuring displacement information using an optical encoder uses an encoder member with multiple digital diffractive optic regions to optically diffract an incident beam of light to produce output beams of light having intensity distribution patterns, which are used to generate electrical signals that provide relative displacement information of the encoder member.

20 Claims, 11 Drawing Sheets

FIG. 8

INTENSITY-BASED OPTICAL ENCODER USING DIGITAL DIFFRACTIVE OPTIC REGIONS

CROSS REFERENCE TO RELATED APPLICATION

This application is entitled to the benefit of U.S. Provisional Patent Application Ser. No. 61/018,613, filed on Jan. 2, 2008, which is incorporated herein by reference.

FIELD OF THE INVENTION

The invention relates generally to encoders, and more particularly to an optical encoder.

BACKGROUND OF THE INVENTION

Optical encoders use optical signals to detect mechanical positions and motions in various types of systems. The mechanical positions and motions detected by optical encoders can be related to linear or rotational displacements of moveable components, such as shafts of motors. There are two common types of optical encoders, absolute position encoders and incremental encoders. Both types of optical encoders can determine mechanical positions and motions. The absolute position encoders can determine the exact mechanical position at any moment of operation, even at power-up. The incremental encoders, on the other hand, lose the existing position data at power-down, and cannot determine the exact mechanical position at power-up. However, the incremental encoders are less expensive and require less processing power than the absolute position encoders. Thus, the incremental encoders enjoy a greater market share than the absolute position encoders.

A conventional optical encoder typically includes an encoder member positioned between a light source and a number of photodetectors. The encoder member includes a number of openings, which allow light from the light source to reach the photodetectors as the encoder member is rotated or linearly displaced with respect to the light source and the photodetectors. The photodetectors generate signals in response to incident light that can be analyzed to determine the relative speed or position of the encoder member with respect to the light source and the photodetectors.

A concern with the described conventional optical encoder is that the encoder member with the opening is relatively expensive to manufacture, which is reflected in the overall cost of the encoder.

In view of this concern, there is a need for a cost-effective optical encoder.

SUMMARY OF THE INVENTION

An optical encoder and method for measuring displacement information using an optical encoder uses an encoder member with multiple digital diffractive optic regions to optically diffract an incident beam of light to produce output beams of light having intensity distribution patterns, which are used to generate electrical signals that provide relative displacement information of the encoder member.

An optical encoder in accordance with an embodiment of the invention comprises a light source, an encoder member and a photodetector. The light source is configured to emit an input beam of light. The encoder member is positioned to receive the input beam of light from the light source. The encoder member includes a plurality of digital diffractive optic regions to optically diffract the input beam of light from the light source to produce output beams of light. At least two of the digital diffractive optic regions are configured such that the output beams of light produced by the at least two of the digital diffractive optic regions have different intensity distribution patterns. The photodetector is positioned to receive the output beams of light from the digital diffractive optic regions of the encoder member as the encoder member is displaced with respect to the light source and the photodetector. The photodetector is configured to produce signals that indicate intensities of the output beams of light at the photodetector. The signals provide relative displacement information of the encoder member.

A method for measuring displacement information using an optical encoder in accordance with an embodiment of the invention comprises emitting a beam of light from a light source of the optical encoder toward an encoder member of the optical encoder, optically diffracting the beam of light received at different digital diffractive optic regions of the encoder member to produce output beams of light as the encoder member is relatively displaced with respect to the light source and a photodetector of the optical encoder, wherein at least two of the output beams of light have different intensity distribution patterns, and producing electrical signals at the photodetector in response to the output beams of light received at the photodetector, the electrical signals indicating intensities of the output beams of light received at the photodetector and providing relative displacement information of the encoder member.

Other aspects and advantages of the present invention will become apparent from the following detailed description, taken in conjunction with the accompanying drawings, illustrated by way of example of the principles of the invention.

DETAILED DESCRIPTION

Figure 1:
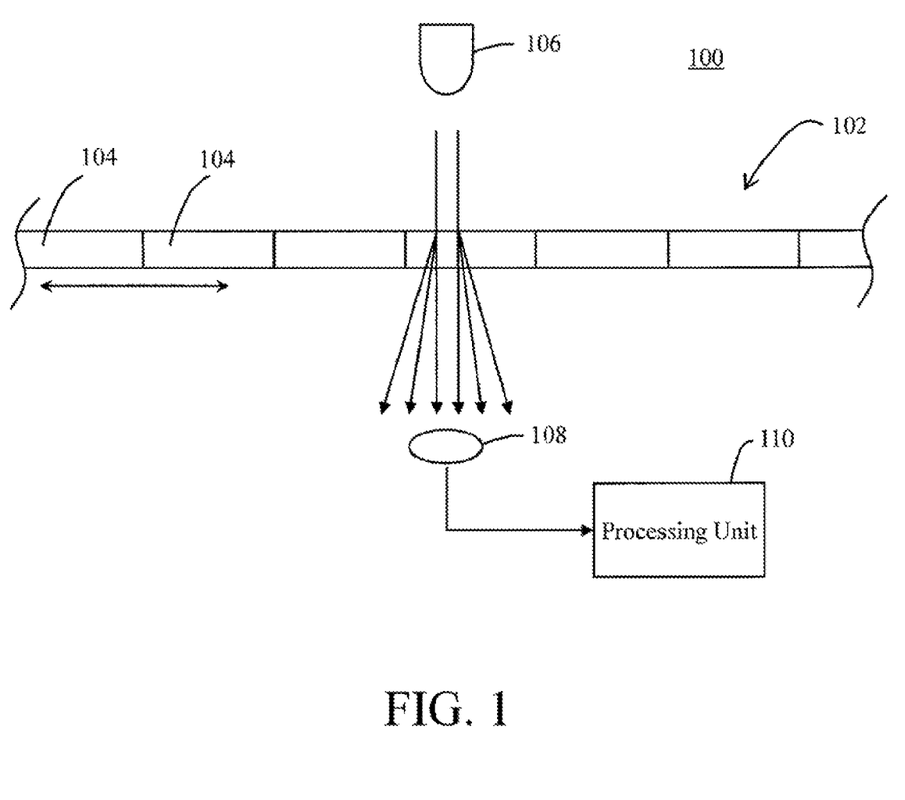
FIG. 1 is a diagram of an optical encoder in accordance with an embodiment of the invention.

With reference to FIG. 1, an optical encoder 100 in accordance with an embodiment of the invention is shown. As described in more detail below, the optical encoder 100 utilizes an encoder member 102 having digital diffractive optic regions 104 rather than an opaque encoder member having one or more tracks of openings used in a conventional optical encoder. As a result, the manufacturing cost of the encoder member 102 is significantly less than the conventional encoder member, which reduces the overall cost of the optical encoder 100.

As shown in FIG. 1, the optical encoder 100 includes the encoder member 102 with the digital diffractive optic regions 104, a light source 106, a photodetector 108 and a processing unit 110. In the illustrated embodiment, the optical encoder 100 is configured as a transmissive-type optical encoder, and thus, the light source 106 and the photodetector 108 are facing opposite sides of the encoder member 102 so that the photodetector is able to receive light from the light source through the encoder member. In other words, in the illustrated embodiment, the encoder member 102 is positioned between the light source 106 and the photodetector 108. However, in other embodiments, the optical encoder 100 may be configured as a reflective-type optical encoder, and thus, the light source 106 and the photodetector 108 are both facing the same side of the encoder member 102.

The light source 106 of the optical encoder 100 can be any type of a light-emitting device, such as a light-emitting diode or a laser diode. Thus, the light source 106 is configured to generate a beam of light. The light source 106 is positioned to emit the beam of light toward the encoder member 102. The photodetector 108 of the optical encoder 100 can be any type of a photosensitive device, such as a photodiode, a phototransistor or a photoresistor. The photodetector 108 is positioned to receive the beam of light from the light source that is transmitted through or reflected from the encoder member 102. The photodetector 108 is configured to generate an electrical signal in response to the received beam of light. This signal generated by the photodetector 108 indicates the intensity of the received beam of light.

The encoder member 102 of the optical encoder 100 is made of a substrate on which the digital diffractive optic regions 104 are formed. The substrate may be made of any appropriate material, which can be used to form the digital diffractive optic regions 104. As an example, the substrate can be made of a plastic material, and the digital diffractive optic regions 104 may be fabricated on the substrate surface. In this example, the encoder member 102 can be manufactured using conventional compact disc (CD) injection molding technology.

The digital diffractive optic regions 104 of the encoder member 102 are small areas formed on the surface of the encoder member having optical properties to optically manipulate an incident beam of light. Each of the digital diffractive optic regions 104 is configured to diffract an incident beam of light to produce an output beam of light having a particular intensity distribution pattern such that the intensity of the light transmitted through that digital diffractive optic region 104 and incident on a certain fixed region, i.e., at the photodetector 108, can be controlled. If the intensity of the light transmitted through a digital diffractive optic region of the encoder member 102 and incident at the photodetector 108 needs to be increased, then that digital diffractive optic region is configured to diffract more light to the photodetector. In contrast, if the intensity of the light transmitted through a digital diffractive optic region 104 and incident at the photodetector 108 needs to be decreased, then that digital diffractive optic region is configured to diffract some of the light away from the photodetector. Using the diffractive properties of the digital diffractive optic regions 104, the optical encoder 100 can be configured to function as an incremental position optical encoder or an absolute position optical encoder based on the intensity of the light incident on the photodetector 108, as described below.

In an embodiment, the digital diffractive optic regions 104 are diffractive optical elements with microstructures that optically manipulate an incident beam of light. The digital diffractive optic regions 104 are "digital" in the way that these regions are designed and fabricated. The digital diffractive optic regions 104 are designed with the aid of a digital computer using an analytical or numerical approach. The digital diffractive optic regions 104 are fabricated in a digital manner using binary photomasks and wafer lithography. Thus, the microstructures of the digital diffractive optic regions 104 are binary (single level) or multilevel microstructures. In contrast, a traditional analog holograms formed by exposing holographically a holographic plate with a laser include analog structures. The microstructures of the digital diffractive optic regions 104 are patterned to achieve the desired optical manipulations, such as beam shaping and beam redirecting. In an embodiment, the microstructures of the digital diffractive optic regions 104 are configured as linear grating microstructures. However, in other embodiments, the microstructures of the digital diffractive optic regions 104 may be configured in complex arrangements designed with the aid of a computer.

As the encoder member 102 is relative displaced with respect to the light source 106 and the photodetector 108, the beam of light from the light source impinges on different digital diffractive optic regions 104 of the encoder member. As used herein, "relative displacement" means that the encoder member 102 is moved as the light source 106 and the photodetector 108 remain stationary or that the encoder member remains stationary as the light source and the photodetector are moved. The digital diffractive optic regions 104 diffract the incident light toward the photodetector 108. These diffracted output beams of light from the encoder member 102 are sequentially transmitted to the photodetector 108, which generates signals in response to the intensities of the received output beams of light.

The processing unit 110 is connected to the photodetector 108 to receive the signals generated by the photodetector. The processing unit 110 is configured to process the received signals to determine relative position and/or speed of the encoder member 102 with respect to the light source 106 and the photodetector 108.

The processing unit 110 may be a general-purpose digital processor such as a microprocessor or microcontroller. In other embodiments, the processing unit 110 may be a special-purpose processor such as a digital signal processor. In still other embodiments, the processing unit 110 may be another type of controller or a field programmable gate array (FPGA).

Figure 2:
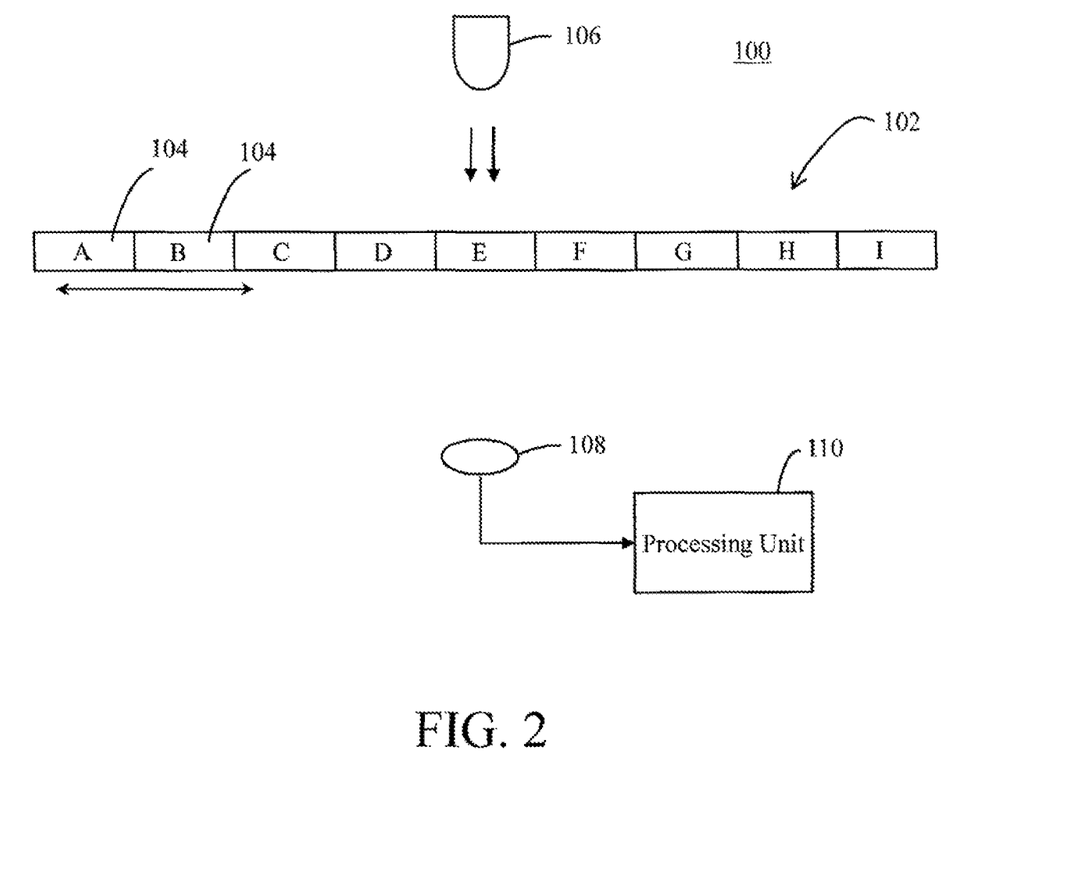
FIG. 2 is a diagram of the optical encoder of FIG. 1 that is configured as an absolute position optical encoder in accordance with an embodiment of the invention.

Turning now to FIG. 2, the optical encoder 100 that is configured as an absolute position optical encoder in accordance with an embodiment of the invention is shown. In this embodiment, each of the digital diffractive optic regions 104 is configured to produce an output beam of light having a unique intensity distribution pattern. That is, each of the digital diffractive optic regions 104 is configured to diffract the beam of light from the light source 106 such that the intensity of the beam of light at the photodetector 108 is unique. Thus, the digital diffractive optic regions 104 are illustrated in FIG. 2 with unique reference letters, A-I, which indicates that the digital diffractive optic regions have different intensity distribution patterns.

Since each of the digital diffractive optic regions 104 produces an output beam of light having a unique intensity distribution pattern, each signal generated by the photodetector 108 in response to an output beam of light incident on the photodetector indicates the digital diffractive optic region 104 that produced the output beam of light. As the encoder member 102 is relatively displaced, the signals generated by the photodetector 108 in response to the incident output beams of light from the digital diffractive optic regions 104 are processed by the processing unit 110 to determine the exact relative position of the encoder member with respect to the light source 106 and the photodetector 108. Using this information, the processing unit 110 can also determine the relative speed and direction of the encoder member 102 with respect to the light source 106 and the photodetector 108.

Figure 3A:
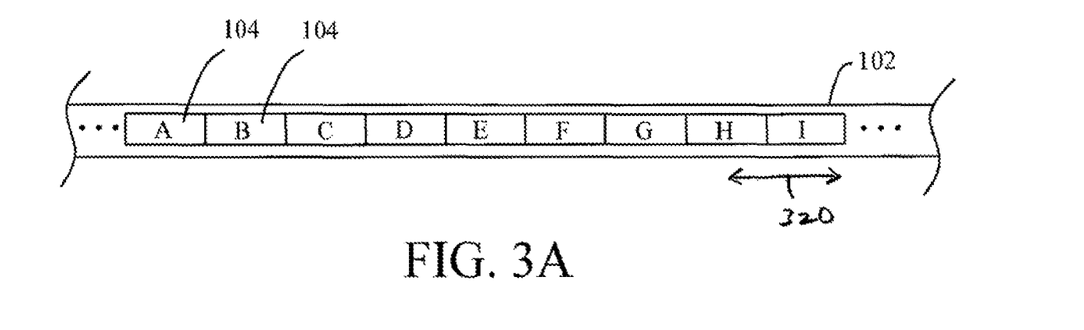
FIG. 3A illustrates an encoder member of the optical encoder of FIG. 2 that is configured as an elongate strip for linear encoding in accordance with an embodiment of the invention.
Figure 3B:
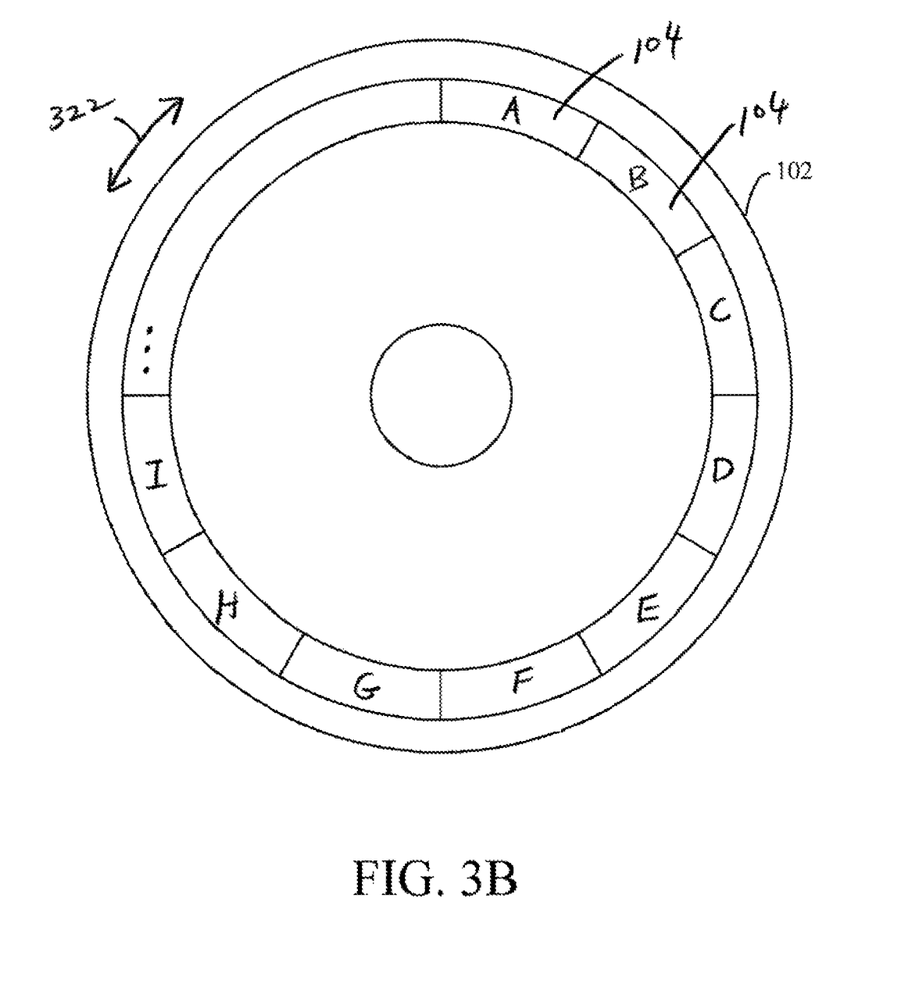
FIG. 3B illustrates an encoder member of the optical encoder of FIG. 2 that is configured as a circular disk for rotary encoding in accordance with an embodiment of the invention.
Figure 3C:
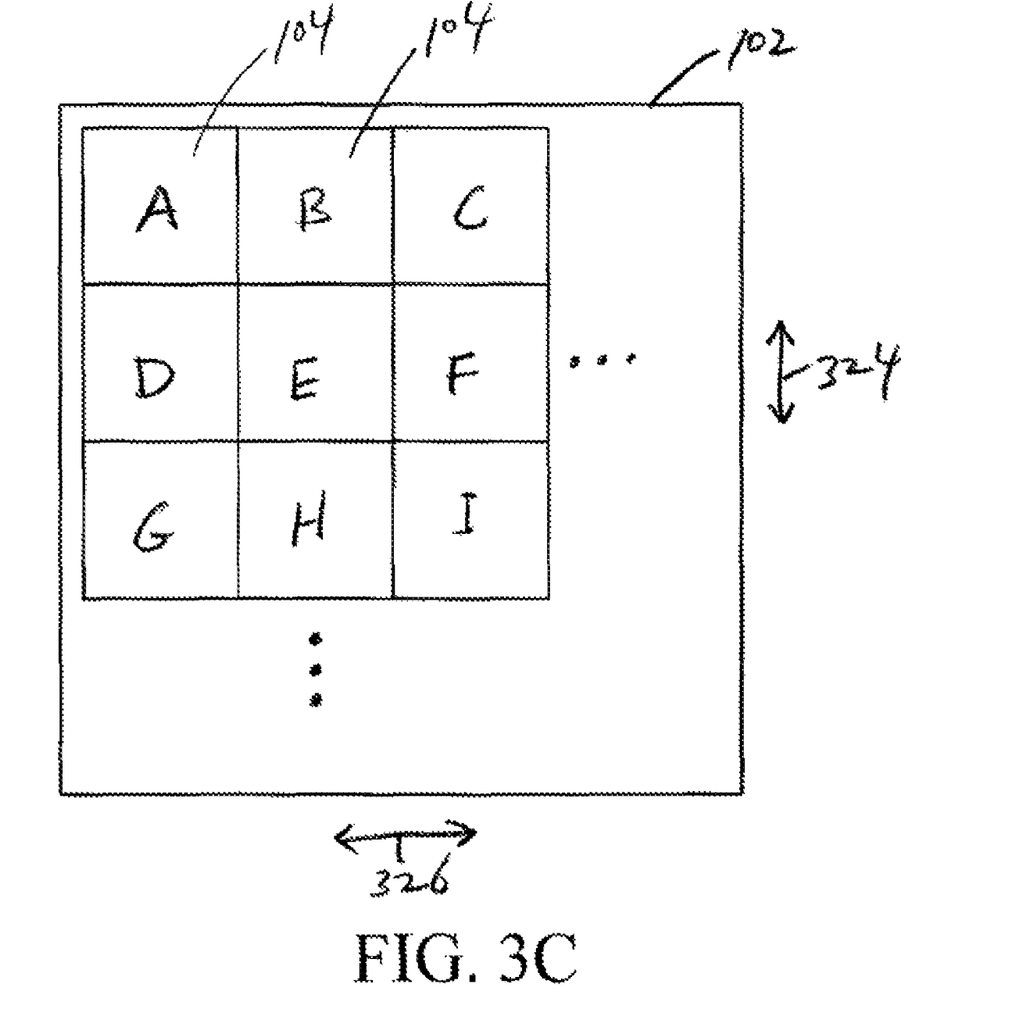
FIG. 3C illustrates an encoder member of the optical encoder of FIG. 2 that is configured as a rectangular plate for planar encoding in accordance with an embodiment of the invention.

The encoder member 102 of the absolute position optical encoder 100 of FIG. 2 can be configured as a linear encoder member, a rotary encoder member or a plane encoder member, as illustrated in FIGS. 3A, 3B and 3C. In FIG. 3A, the encoder member 102 is configured as a linear encoder member, and thus, the encoder member is shaped as a long rectangular encoder member in the shape of an elongate strip that is relatively displaced along the length of the encoder member in a linear direction, as indicated by an arrow 320. As shown in FIG. 3A, the digital diffractive optic regions 104 are arranged linearly along the length of the encoder member 102. The digital diffractive optic regions 104 are shown in FIG. 3A as being rectangular regions. However, in other embodiments, the digital diffractive optic regions 104 may be configured in other shapes, such as other polygonal or circular shapes.

In FIG. 3B, the encoder member 102 is configured as a rotary encoder member, and thus, the encoder member is shaped as a circular disk member that is relatively displaced in an annular direction, as indicated by an arrow 322. As shown in FIG. 3B, the digital diffractive optic regions 104 are arranged annularly on the encoder member 102. The digital diffractive optic regions 104 are shown in FIG. 3B as being arc-shaped block regions. However, in other embodiments, the digital diffractive optic regions 102 may be configured in other shapes.

In FIG. 3C, the encoder member 102 is configured as a two-dimensional encoder member, and thus, the encoder member is shaped as a large rectangular member in the shape of a rectangular plate that is relatively displaced in any planar direction, as indicated by arrows 324 and 326. As shown in FIG. 3C, the digital diffractive optic regions 104 are arranged in rows and columns. The digital diffractive optic regions 104 are shown in FIG. 3C as being square regions. However, in other embodiments, the digital diffractive optic regions 102 may be configured in other shapes, such as other polygonal or circular shapes.

In operation, the light source 106 generates an input beam of light toward the encoder member 102. As the encoder member 102 is relative displaced with respect to the light source 106 and the photodetector 108, the beam of light from the light source impinges on the different digital diffractive optic regions 104 of the encoder member. Consequently, the beam of light from the light source 106 is diffracted by the different digital diffractive optic regions 104, producing output beams of light having different intensity distribution patterns. The output beams of light are sequentially received at the photodetector 108, which generates signals corresponding to the intensities of the received output beams of light. The signals generated by the photodetector 108 are received and processed by the processing unit 110. In this embodiment, since each digital diffractive optic region 104 diffractively produces an output beam of light having a unique intensity distribution pattern, the photodetector 108 generates a unique signal for each of the output beams of light received at the photodetector. Thus, the processing unit 110 is able to determine the exact relative position of the encoder member 102 for each of the unique signals received and processed by correlating that signal with the corresponding digital diffractive optic region 104 of the encoder member.

Figure 4A:
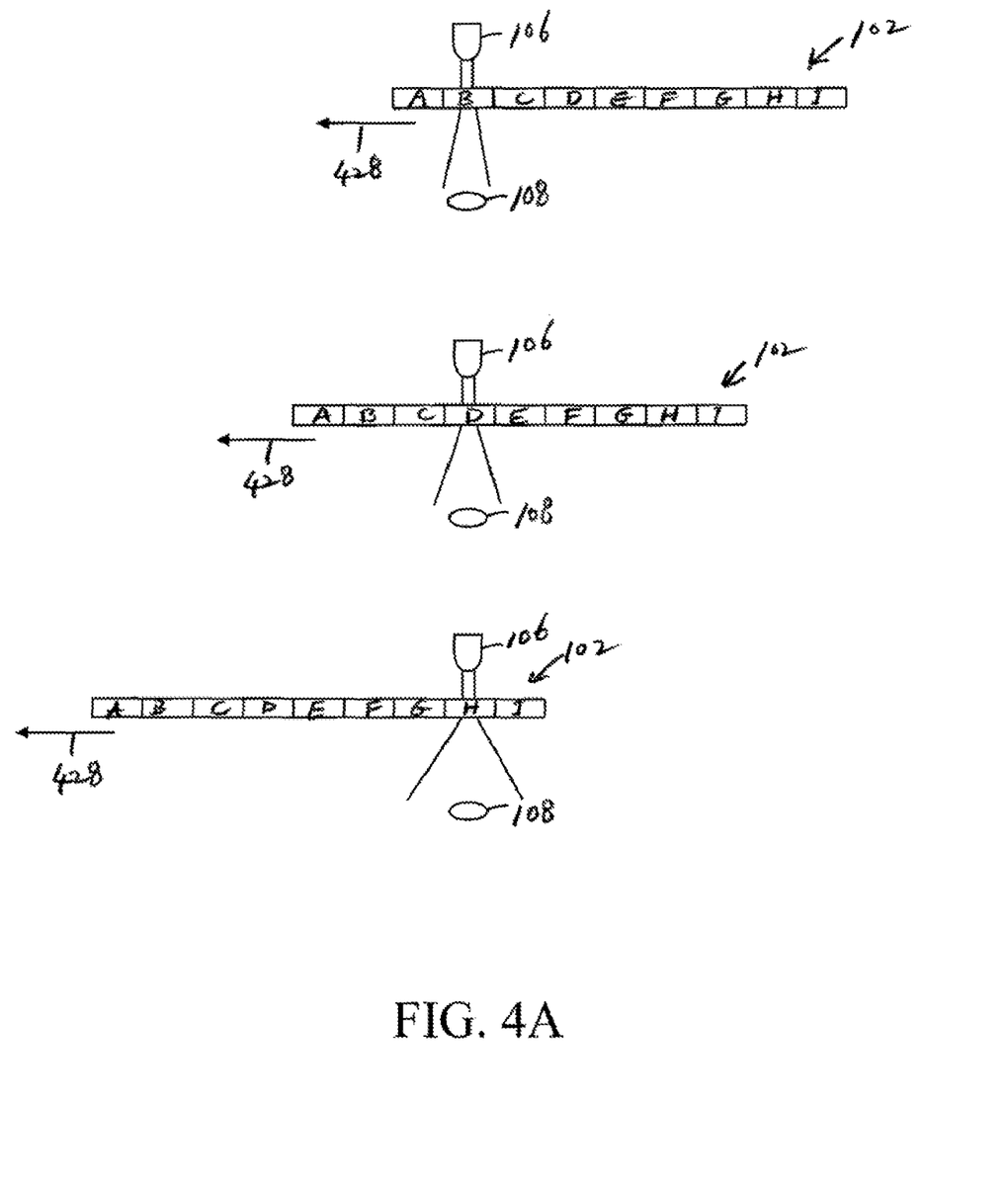
FIG. 4A illustrates output beams of light produced by the encoder member of the optical encoder of FIG. 2 as the encoder member is relatively displaced in accordance with an embodiment of the invention.
Figure 4B:
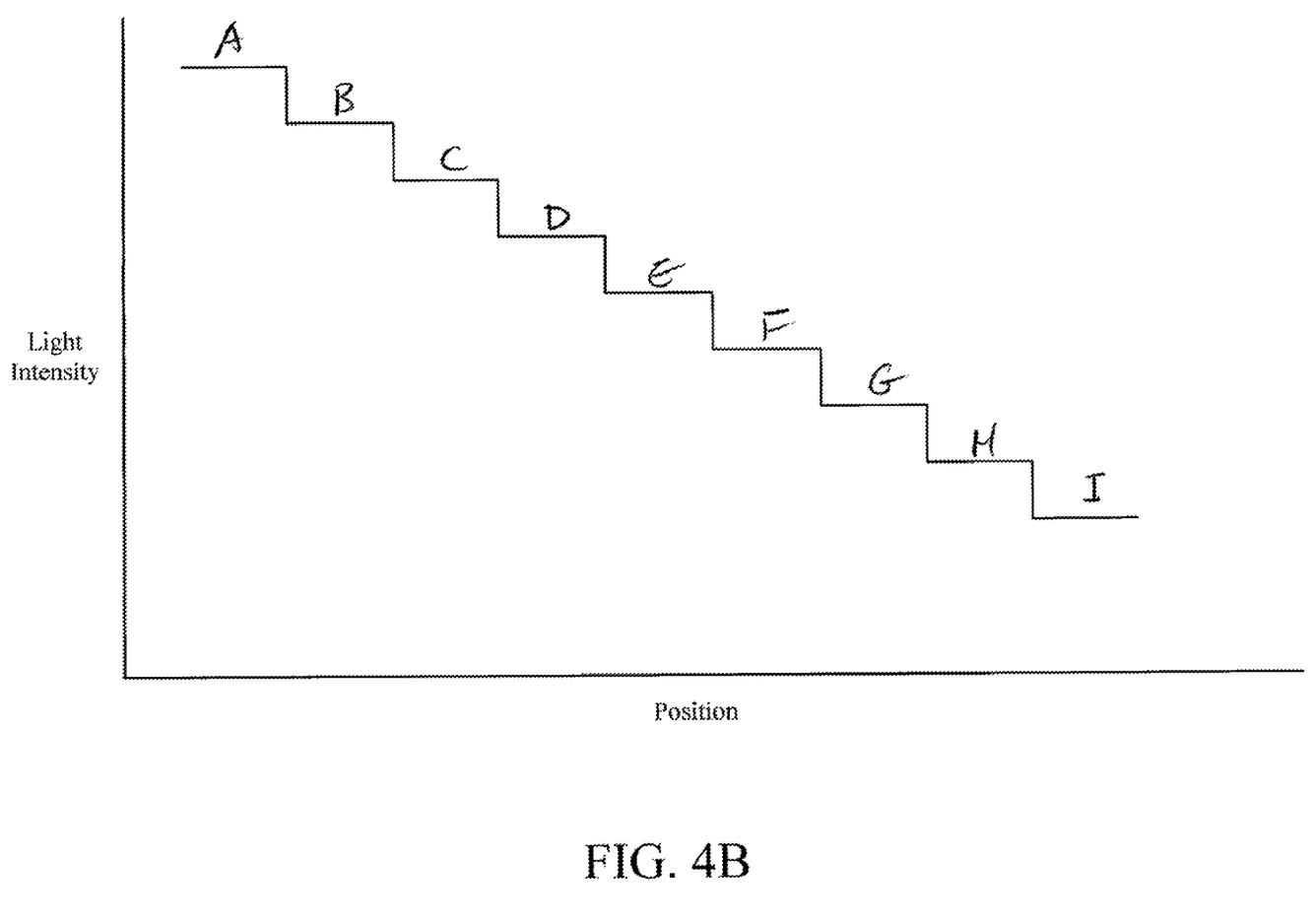
FIG. 4B illustrates the varying light intensity detected by the photodetector 108 as the encoder member is relatively displaced, as shown in FIG. 4A.

An example of the operation of the absolute position optical encoder 100 is described with reference to FIG. 4A. As the encoder member 102 is displaced, the input beam of light from the light source 106 is sequentially transmitted through the different digital diffractive optic regions 104 of the encoder member, which produce output beams of light having different intensity distribution patterns. In this example, the output beam from the "B" digital diffractive optic regions 104 optically diffracts the input beam of light to produce an output beam of light having a narrow intensity distribution pattern, which results in higher intensity on the photodetector 108. In addition, the output beam from the "D" digital diffractive optic regions 104 optically diffracts the input beam of light to produce an output beam of light having a wider intensity distribution pattern, which results in lower intensity on the photodetector 108. Thus, as the encoder member 102 is displaced in a direction indicated by the arrow 428 in FIG. 4A, the light intensity at the photodetector 108 will vary as the different digital diffractive optic regions 104 optically diffract the input beam of light, as illustrated in FIG. 4B. The varying light intensity detected by the photodetector 108 can then be used for measuring the relative displacement of the encoder member 102.

Figure 5:
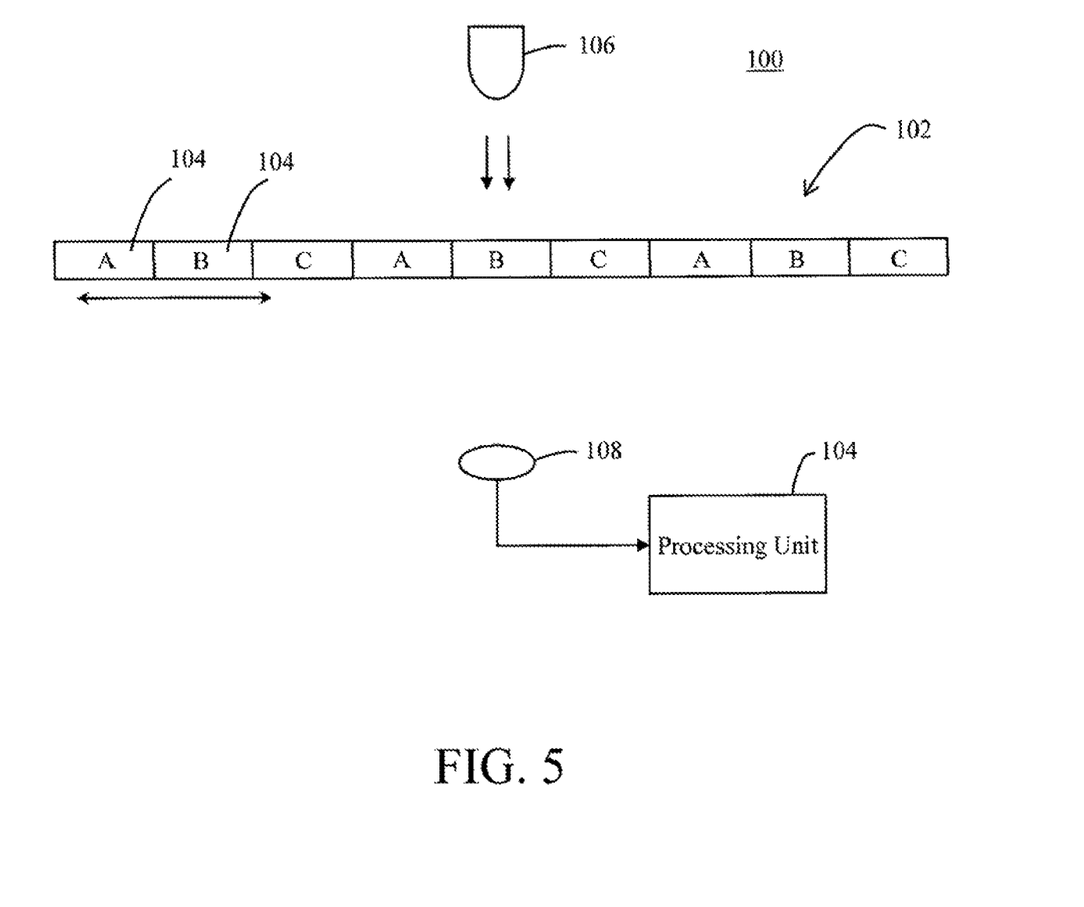
FIG. 5 is a diagram of the optical encoder of FIG. 1 that is configured as an incremental position optical encoder in accordance with an embodiment of the invention.

Turning now to FIG. 5, the optical encoder 100 that is configured as an incremental position optical encoder in accordance with an embodiment of the invention is shown. In this embodiment, groups of the digital diffractive optic regions 104 are configured to produce the same output beam of light having a particular intensity distribution pattern. That is, each of the digital diffractive optic regions 104 in each group is configured to diffract the beam of light from the light source 106 such that the intensity of the beam of light at the photodetector 108 is unique. In the illustrated embodiment, there are three groups of digital diffractive optic regions 104. The digital diffractive optic regions 104 in the first, second and third groups are indicated with the reference letters A, B and C, respectively. However, in other embodiments, the optical encoder 102 may include more than three groups of digital diffractive optic regions 104. For example, the optical encoder 102 may include four groups of digital diffractive optic regions 104. In this embodiment, the digital diffractive optic regions 104 are arranged in a repeating pattern of digital diffractive optic regions with respect to the different groups. As shown in FIG. 4, the repeating pattern of digital diffractive optic regions 104 may be A-B-C.

Since each of the digital diffractive optic regions 104 in a particular group produces an output beam of light having a unique intensity distribution pattern, each signal generated by the photodetector 108 in response to an output beam of light incident on the photodetector indicates the group of the digital diffractive optic region 104 that produced the output beam of light. As the encoder member is relatively displaced, the signals generated by the photodetector 108 in response to the incident output beams of light from the digital diffractive optic regions 104 are processed by the processing unit 110 to determine the direction and relative incremental position of the encoder member with respect to the light source 106 and the photodetector 108. Using this information, the processing unit 110 can also determine the relative speed of the encoder member 102 with respect to the light source 106 and the photodetector 108.

Figure 6A:
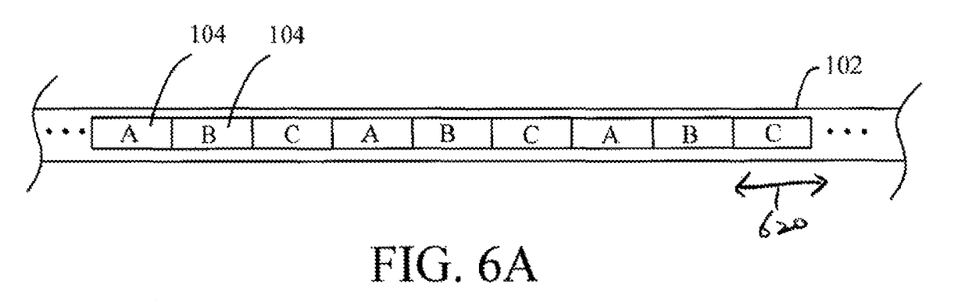
FIG. 6A illustrates an encoder member of the optical encoder of FIG. 5 that is configured as an elongate strip for linear encoding in accordance with an embodiment of the invention.
Figure 6B:
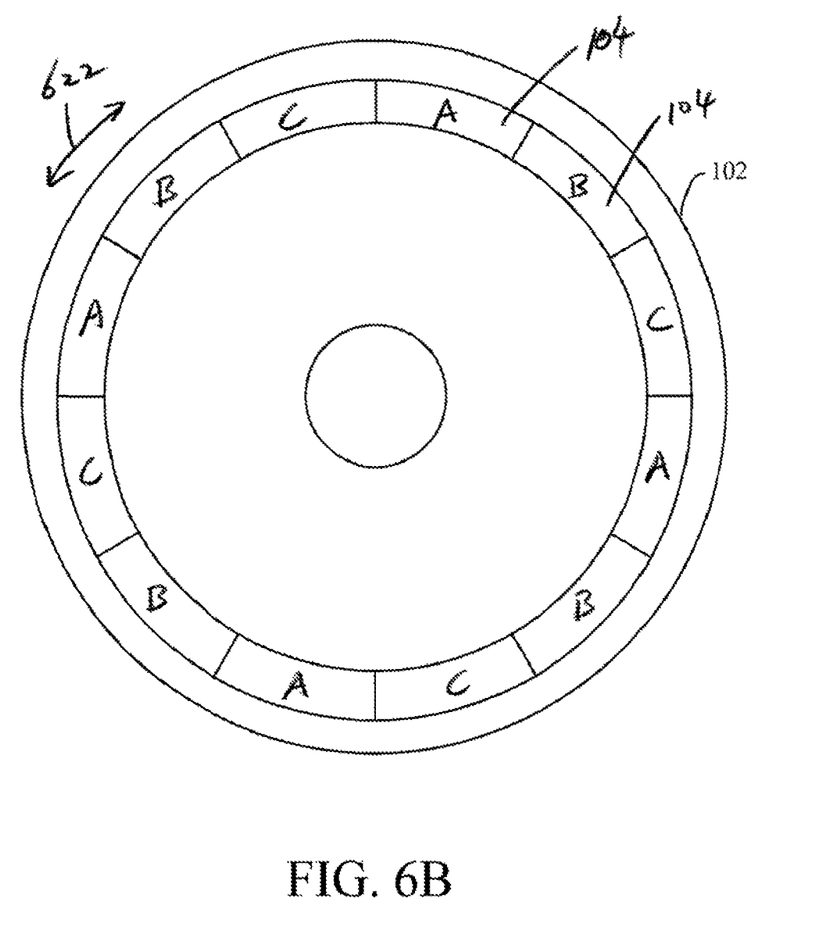
FIG. 6B illustrates an encoder member of the optical encoder of FIG. 5 that is configured as a circular disk for rotary encoding in accordance with an embodiment of the invention.

The encoder member 102 of the incremental position optical encoder 100 of FIG. 5 can be configured as a linear encoder member or a rotary encoder member, as illustrated in FIGS. 6A and 6B. In FIG. 6A, the encoder member 102 is configured as a linear encoder member, and thus, the encoder member is shaped as a long rectangular encoder member that is relatively displaced along the length of the encoder member in a linear direction, as indicated by an arrow 620. As shown in FIG. 6A, the digital diffractive optic regions 104 are arranged linearly along the length of the encoder member 102. The digital diffractive optic regions 104 are shown in FIG. 6A as being rectangular regions. However, in other embodiments, the digital diffractive optic regions 104 may be configured in other shapes, such as other polygonal or circular shapes.

In FIG. 6B, the encoder member 102 is configured as a rotary encoder member, and thus, the encoder member is shaped as a circular disk member that is relatively displaced in an annular direction, as indicated by an arrow 622. As shown in FIG. 6B, the digital diffractive optic regions 104 are arranged annularly on the encoder member 102. The digital diffractive optic regions 104 are shown in FIG. 6B as being arc-shaped block regions. However, in other embodiments, the digital diffractive optic regions 102 may be configured in other shapes.

In operation, the light source 106 generates a beam of light toward the encoder member 102. As the encoder member 102 is relative displaced with respect to the light source 106 and the photodetector 108, the beam of light from the light source impinges on the different digital diffractive optic regions 104 of the encoder member. Consequently, the beam of light from the light source 106 is diffracted by the different digital diffractive optic regions 104, producing output beams of light having different intensity distribution patterns based on the groups to which the digital diffractive optic regions 104 belong. That is, the output beams of light produced by the digital diffractive optic regions 104 of each group have the same intensity distribution pattern, while the output beams of light produced by the digital diffractive optic regions 104 of different groups have different intensity distribution patterns. The output beams of light are sequentially received at the photodetector 108, which generates signals corresponding to the intensities of the received output beams of light. The signals generated by the photodetector 108 are received and processed by the processing unit 110. In this embodiment, since the digital diffractive optic regions 104 of different groups diffractively produce output beams of light having different intensity distribution patterns, the photodetector 108 generates different signals for the output beams of light from the digital diffractive optic regions 104 of the different groups that are received at the photodetector. In addition, since the digital diffractive optic regions 104 of the same group diffractively produce output beams of light having the same intensity distribution pattern, the photodetector 108 generates same signals for the output beams of light from the digital diffractive optic regions 104 of the same group that are received at the photodetector. With the digital diffractive optic regions 104 of the different groups arranged in a repeating pattern on the encoder member 102, the processing unit 110 is able to determine the direction and relative incremental position of the encoder member with respect to the light source 106 and the photodetector 108 by processing the signals received from the photodetector. Using this information, the processing unit 110 can also determine the relative speed of the encoder member 102 with respect to the light source 106 and the photodetector 108.

Figure 7A:
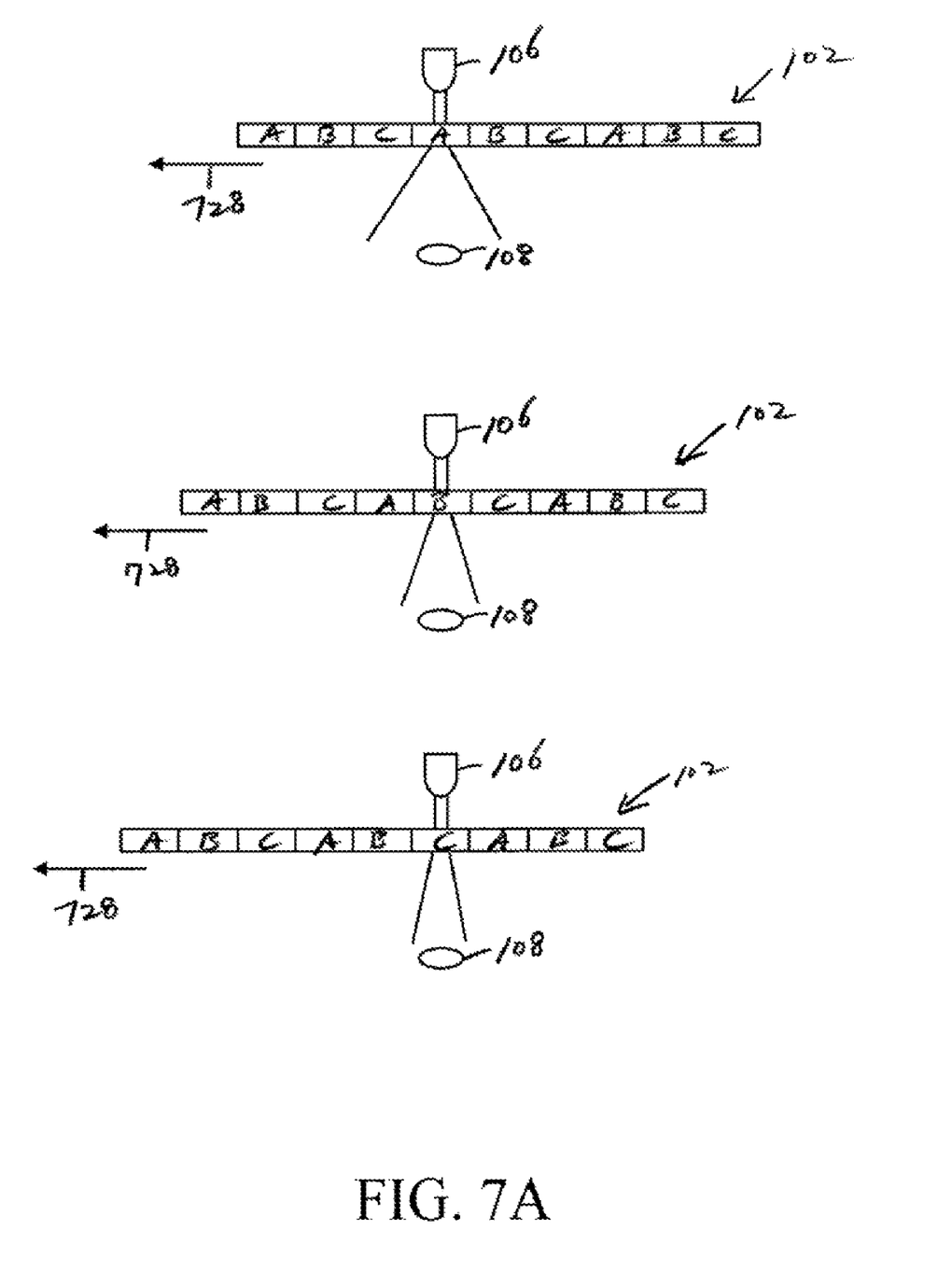
FIG. 7A illustrates output beams of light produced by the encoder member of the optical encoder of FIG. 5 as the encoder member is relatively displaced in accordance with an embodiment of the invention.
Figure 7B:
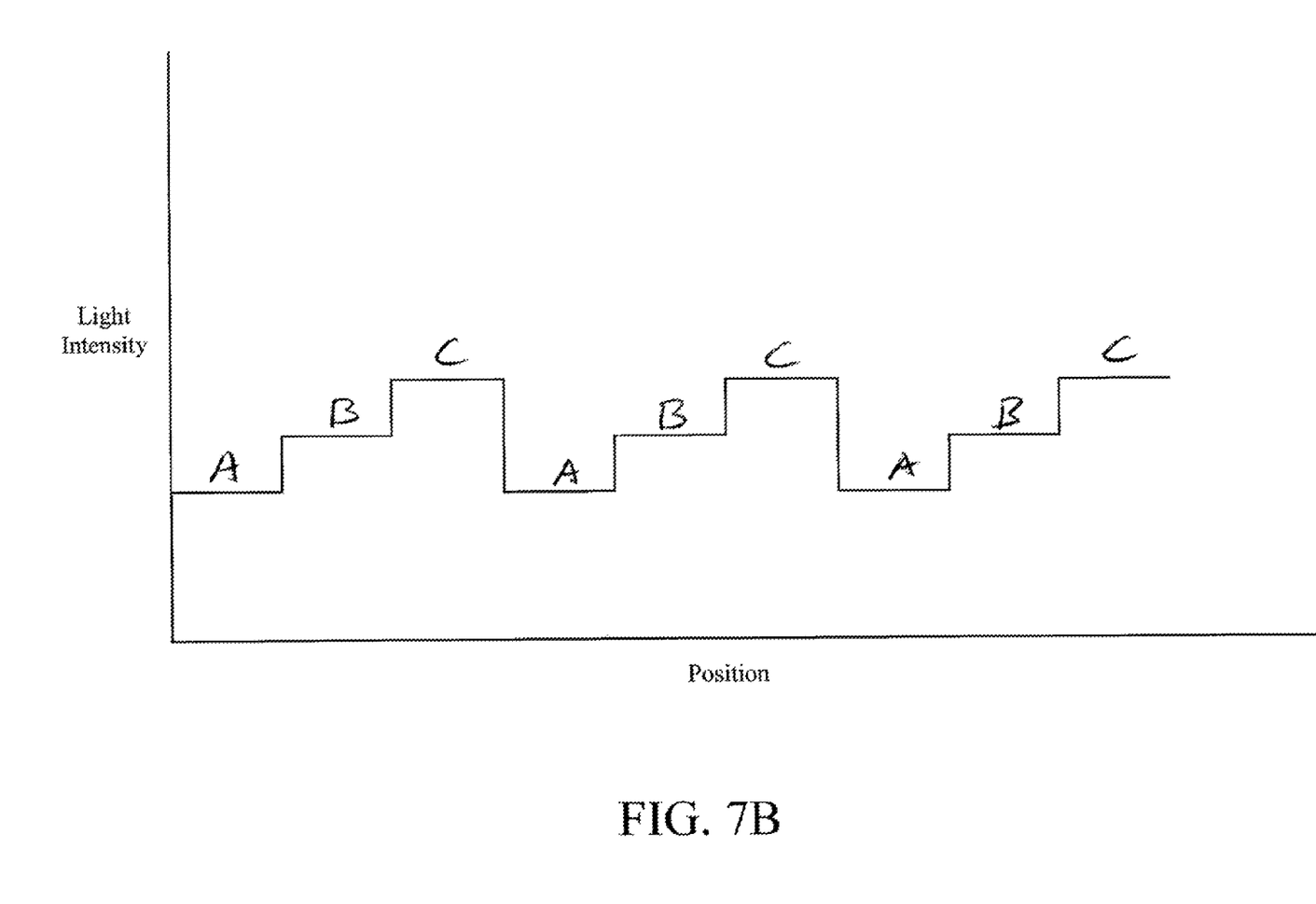
FIG. 7B illustrates the light intensity detected by the photodetector 108 in a repeating pattern as the encoder member is relatively displaced, as shown in FIG. 7A.

An example of the operation of the incremental position optical encoder 100 is described with reference to FIG. 7A. As the encoder member 102 is displaced, the input beam of light from the light source 106 is sequentially transmitted through the different digital diffractive optic regions 104 of the encoder member, which produce output beams of light having different intensity distribution patterns in a particular repeating sequence. In this example, the output beams of light from the "A" digital diffractive optic regions 104 of the first group have the lowest intensity at the photodetector 108, the output beams of light from the "B" digital diffractive optic regions 104 of the second group have the intermediate intensity at the photodetector and the output beams of light from the "C" digital diffractive optic regions 104 of the third group have the highest intensity at the photodetector. Thus, as the encoder member 102 is displaced in a direction indicated by an arrow 728 in FIG. 7A, the light intensity at the photodetector 108 will change in a repeating pattern, as illustrated in FIG. 7B. The changing light intensity detected by the photodetector 108 can then be used for measuring the relative displacement of the encoder member.

A fabrication process of the encoder members 102 of the optical encoder 100 in accordance with an embodiment of the invention is now described. First, a mask layout of the microstructures of the digital diffractive optic regions 104 is designed. The mask layout design can be achieved using an analytical or numerical approach with the aid of a computer. Next, a photomask is produced using the mask layout design. Using the photomask, a master encoder member is produce via photolithographic and etching processes. In this embodiment, a silicon disk is used to produce the master encoder member. Next, the master encoder member is used to produce the encoder member 102 using, for example, embossing, casting or CD injection molding technology. In this fashion, the encoder member 102 can be mass fabricated in a cost effective manner.

In other embodiments, different techniques can be used to produce the master encoder member. These techniques include:

1) Standard CD authoring via laser patterning similar to conventional audio CD master recording on photo-resist covered plate with laser exposure;

2) Successive holographic exposure of an index modulation or surface relief (photoresist) material; and 3) Other exotic lithographic techniques including direct e-beam write, focused ion beam microstructuring, excimer laser micro ablation, fast atom beam exposure, deep proton irradiation, gray scale lithography technologies, etc.

Furthermore, in other embodiments, the master encoder member (as a surface relief element or an index modulation element) may be replicated by successive parallel holographic exposure.

In an alternative embodiment, the digital diffractive optic regions 104 of the encoder member 102 that provide different intensities of light at the photodetector 108 may be configured to control the intensity of light with fixed beam angle. Thus, in this embodiment, the intensity of light is not controlled by varying the diffracting angle of the incident beam of light to spread the beam widely or gather the beam narrowly onto the photodetector 108. In the previous embodiment, each of the digital diffractive optic regions 104 is formed of a single layer diffractive element. However, in this alternative embodiment, each of the diffractive element regions is formed of multiple layers of diffractive element, which are configured to not change the angle of the transmitted beam.

In the different embodiments of the invention, the optical encoder 100 relies on the intensity of the beam of light impinging on the photodetector 108 and not on the positional accuracy of the beam of light impinging on the photodetector. This means that as long as the photodetector 108 is positioned within the diffracted beam area, intensity information of the beam of light can be determined. Consequently, one or more components such as focusing lens, mirrors, or even a slit, which are commonly found in conventional optical encoders, can be eliminated, which can result in smaller packaging and reduce manufacturing complexity. These results can significantly lower the cost of manufacturing the optical encoder 100.

Figure 8:
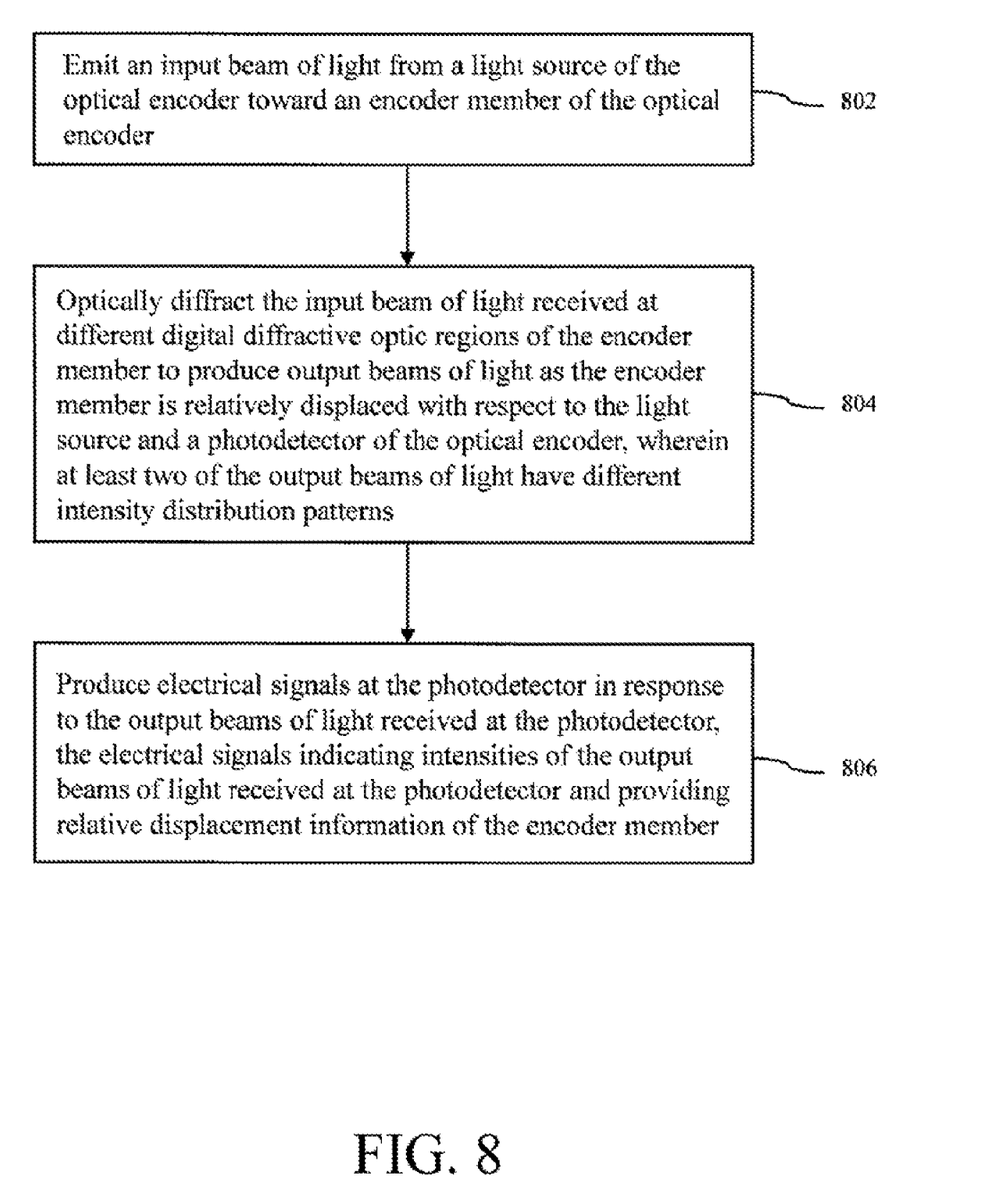
FIG. 8 is a process flow diagram of a method for measuring displacement information using an optical encoder in accordance with an embodiment of the invention is shown.

A method for measuring displacement information using an optical encoder, such as the optical encoder 100, in accordance with an embodiment of the invention is now described with reference to a flow diagram of FIG. 8. At block 802, an input beam of light is emitted from a light source of the optical encoder toward an encoder member of the optical encoder. Next, at block 804, the input beam of light received at different digital diffractive optic regions of the encoder member is optically diffracted to produce output beams of light as the encoder member is relatively displaced with respect to the light source and a photodetector of the optical encoder, wherein at least two of the output beams of light have different intensity distribution patterns. Next, at block 806, electrical signals are produced at the photodetector in response to the output beams of light received at the photodetector. The electrical signals indicate intensities of the output beams of light received at the photodetector and provide relative displacement information of the encoder member.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical encoder comprising:
a light source configured to emit an input beam of light;
an encoder member positioned to receive the input beam of light from the light source, the encoder member including a plurality of digital diffractive optic regions to optically diffract the input beam of light from the light source to produce output beams of light, at least three of the digital diffractive optic regions being configured such that the output beams of light produced by the at least three of the digital diffractive optic regions have three different intensity distribution patterns;

a single photodetector positioned to receive the output beams of light from the digital diffractive optic regions of the encoder member as the encoder member is displaced with respect to the light source and the photodetector, the photodetector being configured to produce signals that indicate intensities of the output beams of light at the photodetector, wherein the encoder member is configured such that the output beams of light produced by the at least three of the digital diffractive optic regions result in three different intensity levels at the photodetector that are indicated in the signals, the signals providing relative displacement information of the encoder member; and a processing unit coupled to the photodetector, the processing unit being configured to process the signals that indicate at least the three different intensity levels exclusively from the photodetector to determine relative displacement of the encoder member.

2. The encoder of claim 1 wherein each of the digital diffractive optic regions is configured to diffract the input beam of light to produce an output beam of light that results in a unique intensity level at the photodetector that differs from intensity levels at the photodetector resulting from the output beams of light produced by the other digital diffractive optic regions so that the processing unit can determine absolute positions of the encoder member using only the signals from the photodetector.

3. The encoder of claim 1 wherein each of the digital diffractive optic regions in a first group is configured to diffract the input beam of light to produce an output beam of light that results in a first intensity level at the photodetector, each of the digital diffractive optic regions in a second group is configured to diffract the input beam of light to produce an output beam of light that results in a second intensity level at the photodetector, and each of the digital diffractive optic regions in a third group is configured to diffract the input beam of light to produce an output beam of light that results in a third intensity level at the photodetector.

4. The encoder of claim 3 wherein the digital diffractive optic regions are arranged on the encoder member in a repeating pattern based on the first, second and third groups such that a digital diffractive optic region of the first group is followed by a digital diffractive optic region of the second group and the digital diffractive optic region of the second group is followed by a digital diffractive optic region of the third group for each repeating pattern.

5. The encoder of claim 1 wherein the encoder member is an elongate strip with the digital diffractive optic regions linearly arranged on the strip along the length of the strip.

6. The encoder of claim 1 wherein the encoder member is a circular disk with the digital diffractive optic regions annularly arranged on the circular disk.

7. The encoder of claim 1 wherein the encoder member is a rectangular plate with the digital diffractive optic regions arranged in rows and columns on the rectangular plate.

8. The encoder of claim 1 wherein the light source includes a light-emitting diode or a laser diode.

9. The encoder of claim 1 wherein the photodetector includes a photodiode, a phototransistor or a photoresistor.

10. The encoder of claim 1 wherein the encoder member is optically transmissive or optically reflective.

11. A method for measuring displacement information using an optical encoder, the method comprising:
emitting a beam of light from a light source of the optical encoder toward an encoder member of the optical encoder;

optically diffracting the input beam of light received at different digital diffractive optic regions of the encoder member to produce output beams of light as the encoder member is relatively displaced with respect to the light source and a single photodetector of the optical encoder, wherein at least three of the different digital diffractive optic regions are configured to produce the output beams of light having three different intensity distribution patterns, the output beams of light resulting in at least three different intensity levels at the photodetector;

producing electrical signals at the photodetector in response to the output beams of light received at the photodetector, the electrical signals indicating at least the three different intensity levels resulting from the output beams of light received at the photodetector from the at least three of the different digital diffractive optic regions and providing relative displacement information of the encoder member; and processing the electrical signals that indicate at least the three different intensity levels exclusively from the photodetector to determine relative displacement of the encoder member.

12. The method of claim 11 wherein the optically diffracting including optically diffracting the beam of light received at the different digital diffractive optic regions of the encoder member such that the output beam of light produced by each of the digital diffractive optic regions results in a unique intensity level at the photodetector that differs from intensity levels at the photodetector resulting from the output beams of light produced by the other digital diffractive optic regions so that absolute positions of the encoder member can be determined using only the electrical signals from the photodetector.

13. The method of claim 11 wherein the optically diffracting includes optically diffracting the beam of light received at the different digital diffractive optic regions of the encoder member such that the output beams of light produced by each of the digital diffractive optic regions in a first group result in a first intensity level at the photodetector, the output beams of light produced by each of the digital diffractive optic regions in a second group result in a second intensity level at the photodetector and the output beams of light produced by each of the digital diffractive optic regions in a third group result in a third intensity level at the photodetector.

14. The method of claim 13 wherein the optically diffracting includes optically diffracting the input beam of light to produce the output beams of light in a repeating pattern based on the first, second and third groups such that an output beam of light having the first intensity distribution pattern is followed by an output beam of light having the second intensity distribution pattern and the output beam of light having the second intensity distribution pattern is followed by the output beams of light having the third intensity distribution pattern.

15. The method of claim 11 further comprising relatively displacing the encoder member along a linear direction.

16. The method of claim 11 further comprising relatively displacing the encoder member along an annular direction.

17. The method of claim 11 further comprising relatively displacing the encoder member along a planar direction.

18. The method of claim 11 wherein the emitting the beam of light includes emitting the beam of light from a light-emitting diode or a laser diode of the optical encoder toward the encoder member of the optical encoder.

19. The method of claim 11 wherein the producing the electrical signals includes producing the electrical signals at a photodiode, a phototransistor or a photoresistor of the optical encoder in response to the output beams of light received at the photodiode, the phototransistor or the photoresistor.

20. The method of claim 11 wherein the optically diffracting the beam of light includes transmitting the beam of light through the encoder member or reflecting the beam of light off the encoder member.

* * * * *